US008082538B2

(12) United States Patent
Hinchey et al.

(10) Patent No.: US 8,082,538 B2
(45) Date of Patent: Dec. 20, 2011

(54) SYSTEMS, METHODS AND APPARATUS FOR DEVELOPING AND MAINTAINING EVOLVING SYSTEMS WITH SOFTWARE PRODUCT LINES

(75) Inventors: Michael G. Hinchey, Bowie, MD (US); James L. Rash, Davidsonville, MD (US); Joaquin Pena, Sevilla (ES)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1483 days.

(21) Appl. No.: 11/536,378

(22) Filed: Sep. 28, 2006

(65) Prior Publication Data

US 2008/0250389 A1    Oct. 9, 2008

Related U.S. Application Data

(60) Provisional application No. 60/805,484, filed on Jun. 22, 2006, provisional application No. 60/811,147, filed on May 15, 2006.

(51) Int. Cl.
*G06F 9/45* (2006.01)

(52) U.S. Cl. .................................................. 717/104
(58) Field of Classification Search ............... 717/107
See application file for complete search history.

(56) References Cited

U.S. PATENT DOCUMENTS

| 7,305,653 | B2 * | 12/2007 | Davis et al. .................. 717/100 |
|---|---|---|---|
| 2003/0005412 | A1 * | 1/2003 | Eanes .......................... 717/120 |
| 2005/0204339 | A1 * | 9/2005 | Davis et al. .................. 717/120 |
| 2006/0161888 | A1 * | 7/2006 | Lovisa et al. ................. 717/107 |
| 2007/0162893 | A1 * | 7/2007 | Moosmann et al. .......... 717/121 |
| 2007/0174811 | A1 * | 7/2007 | Kaetker et al. ............... 717/104 |
| 2007/0186209 | A1 * | 8/2007 | Kaetker et al. ............... 717/104 |
| 2010/0005453 | A1 * | 1/2010 | Argue et al. .................. 717/121 |

* cited by examiner

*Primary Examiner* — John Chavis
(74) *Attorney, Agent, or Firm* — Heather Goo

(57) ABSTRACT

Systems, methods and apparatus are provided through which an evolutionary system is managed and viewed as a software product line. In some embodiments, the core architecture is a relatively unchanging part of the system, and each version of the system is viewed as a product from the product line. Each software product is generated from the core architecture with some agent-based additions. The result may be a multi-agent system software product line.

13 Claims, 14 Drawing Sheets

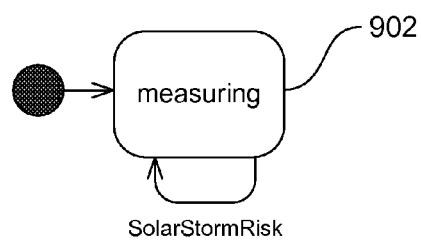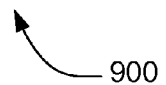
FIG. 9

SYSTEMS, METHODS AND APPARATUS FOR DEVELOPING AND MAINTAINING EVOLVING SYSTEMS WITH SOFTWARE PRODUCT LINES

RELATED APPLICATION

This application claims the benefit of U.S. Provisional Application Ser. No. 60/805,484, filed Jun. 22, 2006, and U.S. Provisional Application Ser. No. 60/811,147, filed May 15, 2006, under 35 U.S.C. 119(e).

ORIGIN OF THE INVENTION

This invention was made by employees of the United States Government and may be manufactured and used by or for the Government for governmental purposes without the payment of any royalties thereon or therefor.

FIELD OF THE INVENTION

This invention relates generally to computer systems software development, and more particularly to version control systems.

BACKGROUND OF THE INVENTION

In computer systems development, the system evolves over time in response to changes in system requirements. When dealing with complex systems, and in particular systems exhibiting any form of autonomy or autonomic properties, it is unrealistic to assume that the system will be static. Complex systems evolve over time, and the architecture of an evolving system will change, even at run time, as the system implements self-configuration and self-adaptation, and meets the challenges of its environment. An evolving software system is typically a system that will likely run for a long period of time, and which likely will be corrected and enhanced and changed over a period of time.

In many systems, some portions of the system change very little, if at all, over time, and yet, other portions of the system can change significantly. For example, a tax form preparation program, such as TurboTax® by Intuit, Inc., changes in large measure every year in response to annual changes in the tax laws.

An evolving system can be viewed as multiple versions of the same system. That is, as the system evolves it essentially represents multiple instances of the same system, each with its own variations and specific changes. With sufficiently significant changes, the resulting new version might even be identified and marketed separately from the earlier versions. In the example of TurboTax®, each annual change prompts sufficiently significant changes in the software to package and market the tax preparation software as a different version from the tax preparation software of earlier years.

Conventional software change management systems, such as Revision Control System (RCS), are problematic in that creation of particular builds of the system requires huge amounts of computing resources. For example, with large systems, such as telecommunication management systems, created by Lucent Technologies, or spacecraft control systems, the creation of a build often takes over twelve hours even with complete dedication of the resources of a high-powered server system.

Similar approaches have appeared also in the object-oriented field, but all of these approaches use role models with the same purpose, namely, representing features of the system in isolation from the final enterprise architecture.

For the reasons stated above, and for other reasons stated below which will become apparent to those skilled in the art upon reading and understanding the present specification, there is a need in the art for an architecture of development of a complex software system that is likely to involve many interacting components, that affords uses of state-of-the-art software engineering techniques and reduces the resource requirements in generating a build from the system.

BRIEF DESCRIPTION OF THE INVENTION

The above-mentioned shortcomings, disadvantages and problems are addressed herein, which will be understood by reading and studying the following specification.

In some embodiments, an evolving software system can be architected as a plurality of software products that are substantially similar, or which have substantially similar content. For example, flight software for different missions can be viewed as a line of products that fulfills this purpose, with many of the products having similarities, or in extreme cases being very similar with a few specializations.

In other embodiments, an evolving system may include a plurality of products in a product line. Different versions or releases of the system may be as different "products" that are substantially similar, which may provide a context and architecture of developing a complex system that is likely to involve many interacting components for development as a product line, which can be developed with state-of-the-art software engineering techniques.

In yet other embodiments, a development architecture of evolving software systems may include core components that are common to an entire system and non-core components that change more frequently than the core components, and wherein the architecture uses a multi-agent approach that provides for easier composition of components and provides for a more autonomous system. In some embodiments, the core components can change infrequently, if at all, from one product to another product, and the non-core components can change frequently, if not always, from one product to another product, to yet another product. This architecture can provide use of state-of-the-art software engineering techniques and can reduce the resource requirements in generating a build from the system.

In still other embodiments, an architecture may be provided of an evolving software product line that will likely run for a long period of time, and which must have corrections, enhancements and changes made to it over a period of time, from which different versions or releases of the system may be different products that are substantially similar. The product line may include software products that are substantially similar, or which have substantially similar content and are distinguished from products in a line of products that the organization develops. For example, flight software for different missions can be viewed as a line of products that fulfills this purpose, with many of the products having similarities, or in extreme cases being very similar with a few specializations. The architecture can provide for developing a complex system that is likely to involve many interacting components for development as a product line, which can be developed with state-of-the-art software engineering techniques.

In further embodiments, different versions/releases of a system can be viewed as being a distinct product within a product line. The new version of a software system may be viewed as a product and may be amenable to state of the art techniques for the development of product lines.

In yet a further embodiment, a product-oriented architecture of evolving systems can provide development of a plethora of tools to support development.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 8, FIG. 9 and FIG. 10 are block diagrams of an evolution plan, according to embodiments measuring solar storm risk.

DETAILED DESCRIPTION OF THE INVENTION

In the following detailed description, reference is made to the accompanying drawings that form a part hereof, and in which is shown, by way of illustration, specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, embodiments of methods are described. In the third section, a hardware and operating environment in conjunction with which embodiments may be practiced is described. In the fourth section, a conclusion of the detailed description is provided.

System Level Overview

Figure 1:
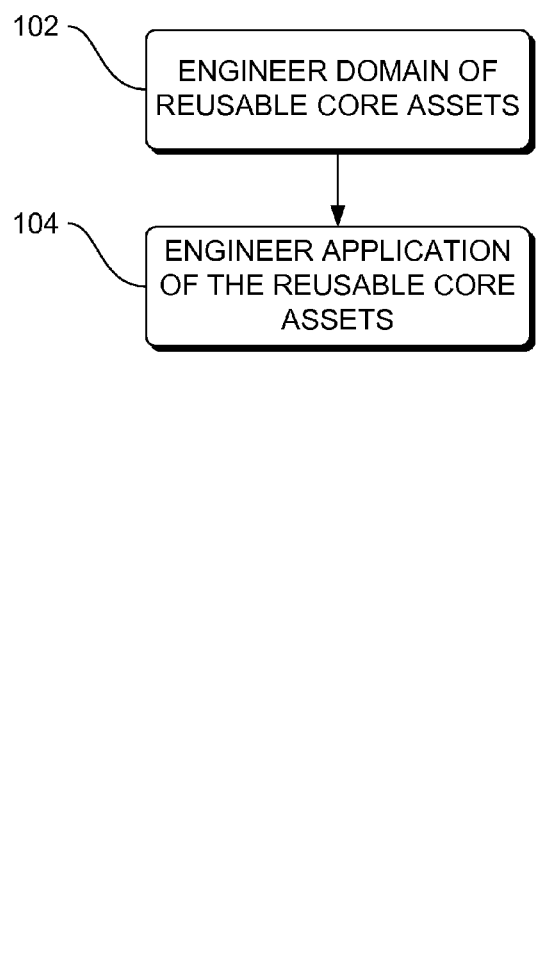
FIG. 1 is a block diagram of an overview of a method to develop software, according to an embodiment.

FIG. 1 is a block diagram of an overview of a method 100 to develop software, according to an embodiment. Method 100 may solve the need in the art for an architecture of development of complex software systems that involves many interacting components and that affords use of state-of-the-art software engineering techniques and reduces the resource requirements in generating a build from the system.

In some embodiments of method 100, an evolving system may be viewed as a product line of systems, where the core architecture of the product line is fixed (i.e., the substantial part of the system that does not change), and each version of the evolving system may be viewed as a particular product from the product line. Similarly, an enterprise architecture may be designed to include a core architecture that is unchanging, and various specializations of the architecture (as the enterprise evolves) may implement various products of the product line.

Method 100 may include domain engineering 102 of reusable core assets. The domain engineering 102 can provide reusable core assets or components that are exploited during application engineering when assembling or customizing individual applications.

Method 100 may also include application engineering 104 of the reusable core assets or components.

The reusable core assets and the application engineered portions may be suitable for state-of-the-art software engineering techniques. Thus, method 100 may solve the need for an architecture of development of a complex software system that is likely to involve many interacting components that affords uses of state-of-the-art software engineering techniques and reduces the resource requirements in generating a build from the system.

In some embodiments, the specialization to various products (versions of the system) can be viewed as agent-based additions. The result can be an evolving system that may be a software product line of multi-agent systems (MAS).

The method and architecture of FIG. 1 may scale to enterprise architectures and software architectures for two reasons. First, a multi-agent system (MAS) can be an appropriate way of representing an enterprise and the interactions and cooperation between agents in the MAS, as a result of an organizational metaphor that architects the system and reflects the real enterprise organization. In addition, differences between the enterprise architecture and the software architecture can be mitigated through the addition of architectural concepts at the running platform. MAS platforms may be able to manage architectural evolutions and support architectural concepts at the implementation level. In particular, method 100 can factorize a complex system into a set of simpler systems, such as storing and managing how to evolve from product one to another product. Tests of a product that are based on formal methods may be more feasible since the product to be checked may require less storage space and the test may be less complex.

Figure 2:
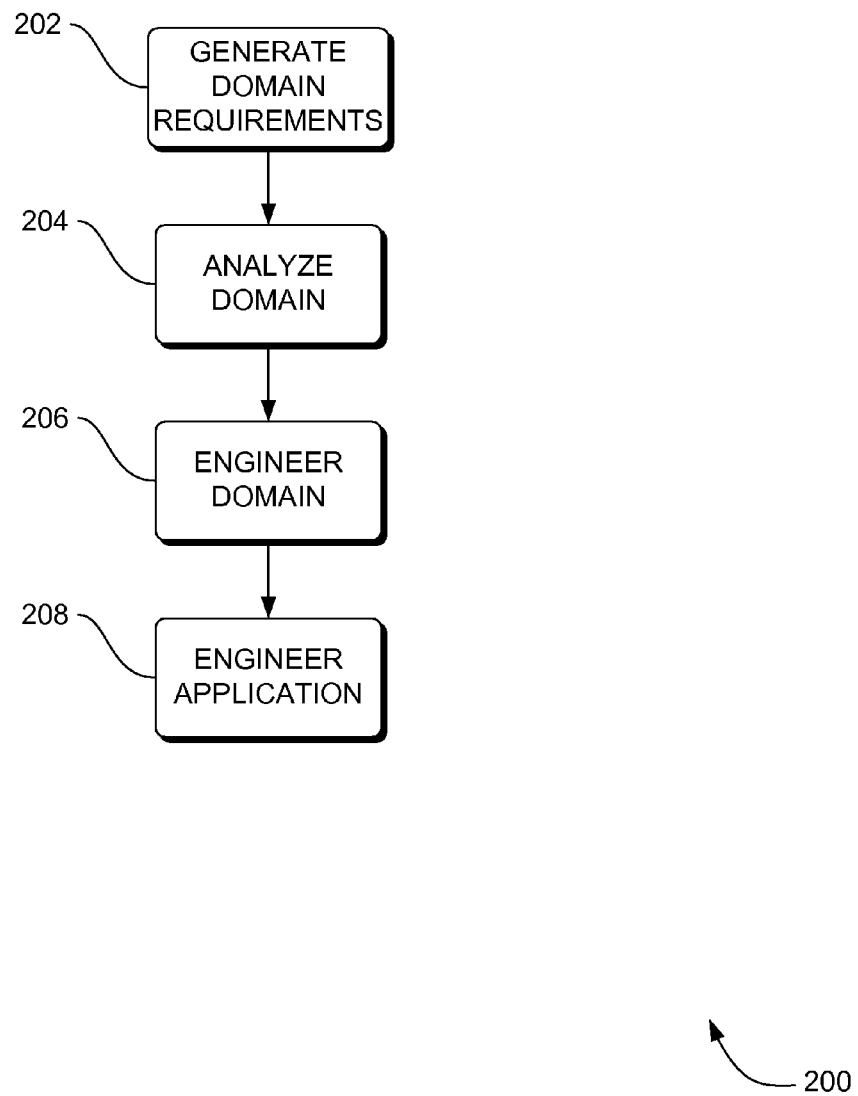
FIG. 2 is a block diagram of an overview of a method to develop software, according to an embodiment.

FIG. 2 shows an embodiment of method 100 in which actions 102 and 104 are divided into requirements, analysis, design, and implementation (e.g. a typical software development lifecycle). FIG. 2 is described in more detail below.

Figure 3:
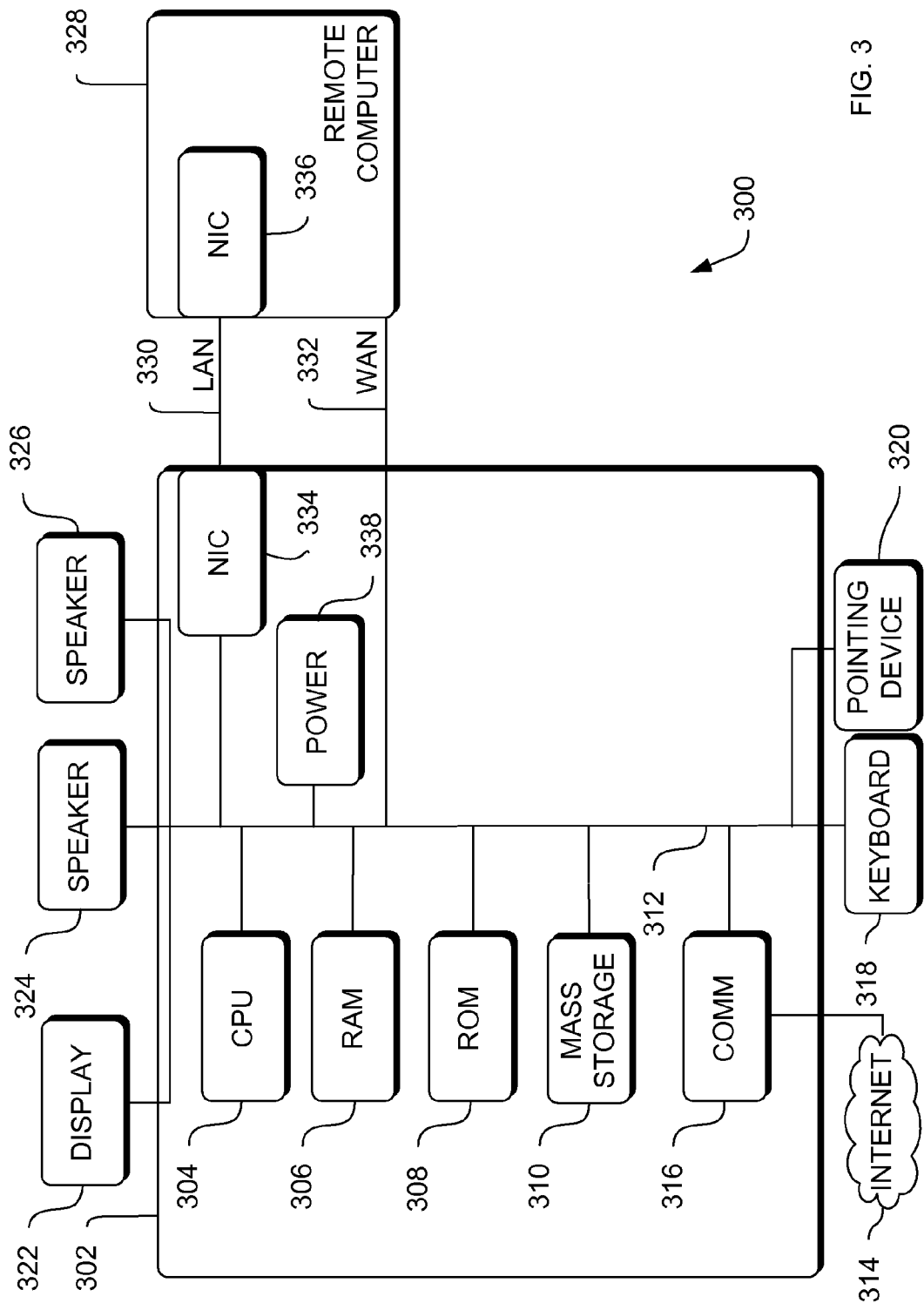
FIG. 3 is a block diagram of a hardware and operating environment in which different embodiments can be practiced.

The system level overview of the operation of some embodiments is described in this section of the detailed description. Some embodiments can operate in a multi-processing, multi-threaded operating environment on a computer, such as computer 302 in FIG. 3. The operating environment of FIG. 3 is discussed in more detail below.

While the method 100 is not limited to any particular domain engineering 102 and application engineering 104, for sake of clarity, simplified domain engineering 102 and application engineering 104 are described.

Method Embodiments

In the previous section, a system level overview of the operation of an embodiment is described. In this section, some embodiments of methods are described by reference to a series of flowcharts. Describing the methods by reference to a flowchart can enable one skilled in the art to develop programs, firmware, and hardware, including instructions to carry out the methods on suitable computers, and executing the instructions from computer-readable media. Similarly, the methods performed by the server computer programs, firmware, or hardware can also be composed of computer-executable instructions. Methods 100-200 can be performed by a program executing on, or performed by firmware or hardware that is a part of a computer, such as computer 302 in FIG. 3.

FIG. 2 is a block diagram of an overview of a method 200 to develop software, according to an embodiment. Method 200 may solve the need in the art for an architecture of development of complex software systems that involves many interacting components and that affords uses of state-of-the-art software engineering techniques and reduces the resource requirements in generating a build from the system.

Method 200 may include generating 202 domain requirements. Generating 202 domain requirements can provide a description of the requirements of the complete family of products, highlighting both the common and variable features across the family. In generating 202 the domain requirements, commonality analysis can assist in distinguishing between commonalities and variations. Models may use generating 202 domain requirements for specifying features such as when a feature is optional, mandatory or alternative in the family. Such models may be called feature models. A feature could be a characteristic of the system that is observable by the end user, which in essence represents the same concept as a system goal, as shown previously.

Method 200 may also include domain analysis 204. Analyzing 204 the domain can produce architecture-independent role models, i.e. acquaintance organization models that define the features of the family and the domain of application. In a software product line of multi-agent systems (MAS-PLs), role models can represent the interfaces and interactions needed to cover certain functionality, such as a feature or a set of features, independently. In regards to acquaintance organization models, an acquaintance organization can be modeled orthogonally to its structural organization. Such orthogonal modeling can provide change to the system goals that are enabled in the system by changing the parts of the acquaintance organization present in the structural organization. Changing the parts of the acquaintance organization can be an important aspect of both software product lines and MAS-PLs.

This software product line paradigm (SPL) may augur the potential of developing a core architecture from which customized products can be rapidly generated, reducing time-to-market, costs, and so forth, while simultaneously improving quality by making greater effort in design, implementation and testing more financially viable, as this effort can be amortized over several products.

In a MAS-PL, the enterprise architecture of the system can be observed from at least two different points of view. These two views are as follows:

First, an acquaintance point of view can show the organization as the set of interaction relationships between the roles played by agents in models called role models. The acquaintance point of view can focus on the interactions within the system and also on representing how a functionality designated by a system goal can be achieved.

Second, the structural point of view can show agents as artifacts that belong to sub-organizations, groups and teams. In this view, agents may be structured into hierarchical constructions showing the social structure of the system. The structural point of view can show which agents may be playing which roles in the acquaintance organization, and thus may show how system goals can be achieved by the interaction of agents.

Method 200 may also include domain engineering 206. In domain engineering 206, a core architecture of the family can be produced, which may be termed the core structural organization of the system. The core architecture can be formed as a composition of the role models corresponding to the more stable features in the system.

In some embodiments of method 200 of generating 202 the domain requirements, analyzing 204 the domain, and engineering 206 the domain may comprise domain engineering 102 of reusable core assets of FIG. 1.

Method 200 may also include application engineering 208. Application engineering 208 can build/generate concrete products.

The reusable core assets and the application engineered portions may be suitable for state-of-the-art software engineering techniques. Thus, method 100 may solve the need for an architecture of development of a complex software system that is likely to involve many interacting components that affords uses of state-of-the-art software engineering techniques and reduces the resource requirements in generating a build from the system.

In some embodiments, methods 100-200 may be implemented as a computer data signal embodied in a carrier wave that represents a sequence of instructions, which, when executed by a processor, such as processor 304 in FIG. 3, cause the processor to perform the respective method. In other embodiments, methods 100-200 may be implemented as a computer-accessible medium having executable instructions capable of directing a processor, such as processor 304 in FIG. 3, to perform the respective method. In varying embodiments, the medium may be a magnetic medium, an electronic medium, or an optical medium.

Hardware and Operating Environment

FIG. 3 is a block diagram of a hardware and operating environment 300 in which different embodiments can be practiced. The description of FIG. 3 provides an overview of computer hardware and an example of a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 302 may include a processor or CPU 304, commercially available from Intel, Motorola, Cyrix and others. Computer 302 may also include random-access memory (RAM) 306, read-only memory (ROM) 308, and one or more mass storage devices 310, and a system bus 312, that operatively couples various system components to the processing unit 304. The memory 306, 308, and mass storage devices, 310, may be types of computer-accessible media. Mass storage devices 310 can be more specifically types of nonvolatile computer-accessible media and can include one or more hard disk drives, floppy disk drives, optical disk drives, and tape cartridge drives. The processor 304 may execute computer programs stored on the computer-accessible media.

Computer 302 can be communicatively connected to the Internet 314 via a communication device 316. Internet 314 connectivity is well known within the art. In one embodiment, a communication device 316 can be a modem that responds to communication drivers to connect to the Internet via what is known in the art as a "dial-up connection." In another embodiment, a communication device 316 can be an Ethernet® or similar hardware network card connected to a local-area network (LAN) that itself is connected to the Internet via what is known in the art as a "direct connection" (e.g., T1 line, etc.).

A user can enter commands and information into the computer 302 through input devices such as a keyboard 318 or a pointing device 320. The keyboard 318 can permit entry of textual information into computer 302, as known within the art, and embodiments are not limited to any particular type of keyboard. Pointing device 320 can permit the control of the screen pointer provided by a graphical user interface (GUI) of operating systems such as versions of Microsoft Windows®. Embodiments are not limited to any particular pointing device 320. Such pointing devices may include mice, touch pads, trackballs, remote controls and point sticks. Other input devices (not shown) can include a microphone, joystick, game pad, satellite dish, scanner, or the like.

In some embodiments, computer 302 may be operatively coupled to a display device 322. Display device 322 can be connected to the system bus 312. Display device 322 can permit the display of information, including computer, video and other information, for viewing by a user of the computer. Embodiments are not limited to any particular display device 322. Such display devices may include cathode ray tube (CRT) displays (monitors), as well as flat panel displays such as liquid crystal displays (LCD's). In addition to a monitor, computers can typically include other peripheral input/output devices such as printers (not shown). Speakers 324 and 326 can provide audio output of signals. Speakers 324 and 326 may also be connected to the system bus 312.

Computer 302 may also include an operating system (not shown) that is stored on the computer-accessible media RAM 306, ROM 308, and mass storage device 310, and is and executed by the processor 304. Examples of operating systems may include Microsoft Windows®, Apple MacOS®, Linux®, UNIX®. Examples are not limited to any particular operating system, however, and the construction and use of such operating systems are well known within the art.

Embodiments of computer 302 are not limited to any type of computer 302. In varying embodiments, computer 302 can comprise a PC-compatible computer, a MacOS®-compatible computer, a Linux®-compatible computer, or a UNIX®-compatible computer. The construction and operation of such computers are well known within the art.

Computer 302 can be operated using at least one operating system to provide a graphical user interface (GUI) including a user-controllable pointer. Computer 302 can have at least one web browser application program executing within at least one operating system, to permit users of computer 302 to access an intranet, extranet or Internet world-wide-web pages as addressed by Universal Resource Locator (URL) addresses. Examples of browser application programs include Netscape Navigator® and Microsoft Internet Explorer®.

The computer 302 can operate in a networked environment using logical connections to one or more remote computers, such as remote computer 328. These logical connections can be achieved by a communication device coupled to, or a part of, the computer 302. Embodiments are not limited to a particular type of communications device. The remote computer 328 can be another computer, a server, a router, a network PC, a client, a peer device or other common network node. The logical connections depicted in FIG. 3 include a local-area network (LAN) 330 and a wide-area network (WAN) 332. Such networking environments are commonplace in offices, enterprise-wide computer networks, intranets, extranets and the Internet.

When used in a LAN-networking environment, the computer 302 and remote computer 328 can be connected to the local network 330 through network interfaces or adapters 334, which is one type of communications device 316. Remote computer 328 may also include a network device or NIC 336. When used in a conventional WAN-networking environment, the computer 302 and remote computer 328 can communicate with a WAN 332 through modems (not shown). The modem, which can be internal or external, may be connected to the system bus 312. In a networked environment, program modules depicted relative to the computer 302, or portions thereof, can be stored in the remote computer 328.

Computer 302 can also include a power supply 338. Each power supply can be a battery.

Apparatus for Analyzing Complex Multiagent Systems Implementations

In FIGS. 4-12, particular implementations are described in conjunction with the system overview in FIG. 1 and the methods described in conjunction with FIGS. 1 and 2. FIGS. 4-12 use the Unified Modeling Language (UML) 2.0, which is an industry-standard language to specify, visualize, construct, and document the object-oriented artifacts of software systems. Composition can define the attributes of an instance of a class as containing an instance of one or more existing instances of other classes in which the composing object does not inherit from the object(s) it is composed of.

In FIGS. 4-12, some embodiments of an evolutionary MAS are modeled. As discussed above, each product in a MAS-PL can be defined as a set of features. Given that all the products present a set of features that may remain unchanged, the core architecture can be defined as the part of all of the products that implement these common features. Thus, a system can evolve by changing, or evolving, the set of non-core features.

A product or a state in an evolutionary system may be defined as a set of features with the following relationships, by way of example. Let $F=\{f1 \ldots fn\}$ be the set of all features of a MAS-PL. Let $cF \subset F$ be the set of core features and $ncF=F\backslash cF$ be the set of non-core features. A valid state S of the system may be defined as the set of core features and a set of non-core features, that is to say, $S=cF \cup sF$, where $sF \subset ncF$ is a subset of non-core features.

Thus, the evolution from one state $S_{i-1}$ to another $S_i$ can be characterized as: $S_i=S_{i-1} \cup nF_{i,i-1}\backslash dF_{i,i-1}$ where $nf_{i,i-1} \subset ncF$ is the set of new features and $dF_{i,i-1} \subset ncF$ is the set of deleted features. $\Delta_{i,i-1}$ can describe the variation or change between the product of the state i-1 and the product of the state i, that is to say, $nF_{i,i-1}\backslash dF_{i,i-1}$.

In some embodiments, a feature may correlate with a role model. Thus, for a system to evolve from one state to another, the role models in nF and dF may be composed or decomposed. Specifically, the role models may be composed corresponding to the features in nF with the role models corresponding to the features that remain unchanged from the initial state $S_{i-1}$, that is to say $S_i\backslash dF_{i,i-1}$. Decomposition can be used for role models that must be eliminated.

In FIGS. 4-12, some embodiments of role models and the operations for composition and decomposition are described. In the illustrated embodiments, the Methodology for Analyzing Complex Multiagent Systems (MaCMAS) methodology is implemented, although one skilled in the art will recognize that other methodologies may be implemented that fall within the scope of this invention. MaCMAS is an agent-oriented software engineering (AOSE) methodology. MaCMAS is specially tailored to model complex acquaintance organizations. MaCMAS is implemented herein by way of example because MaCMAS provides explicit support for MAS-PLs.

A static acquaintance organization view can show the static interaction relationships between roles in the system and the knowledge processed by the roles. In this category there may be models for representing the ontology managed by agents, models for representing their dependencies, and role models.

FIGS. 4-12 can be used by way of example to describe a swarm of pico-spacecraft that may be used to prospect or explore the asteroid belt. The enterprise architecture of the system may change at run-time depending on the environment and the state of the swarm. From all the possible evolutions, only two states of the system are shown in FIGS. 4-12.

Figure 4:
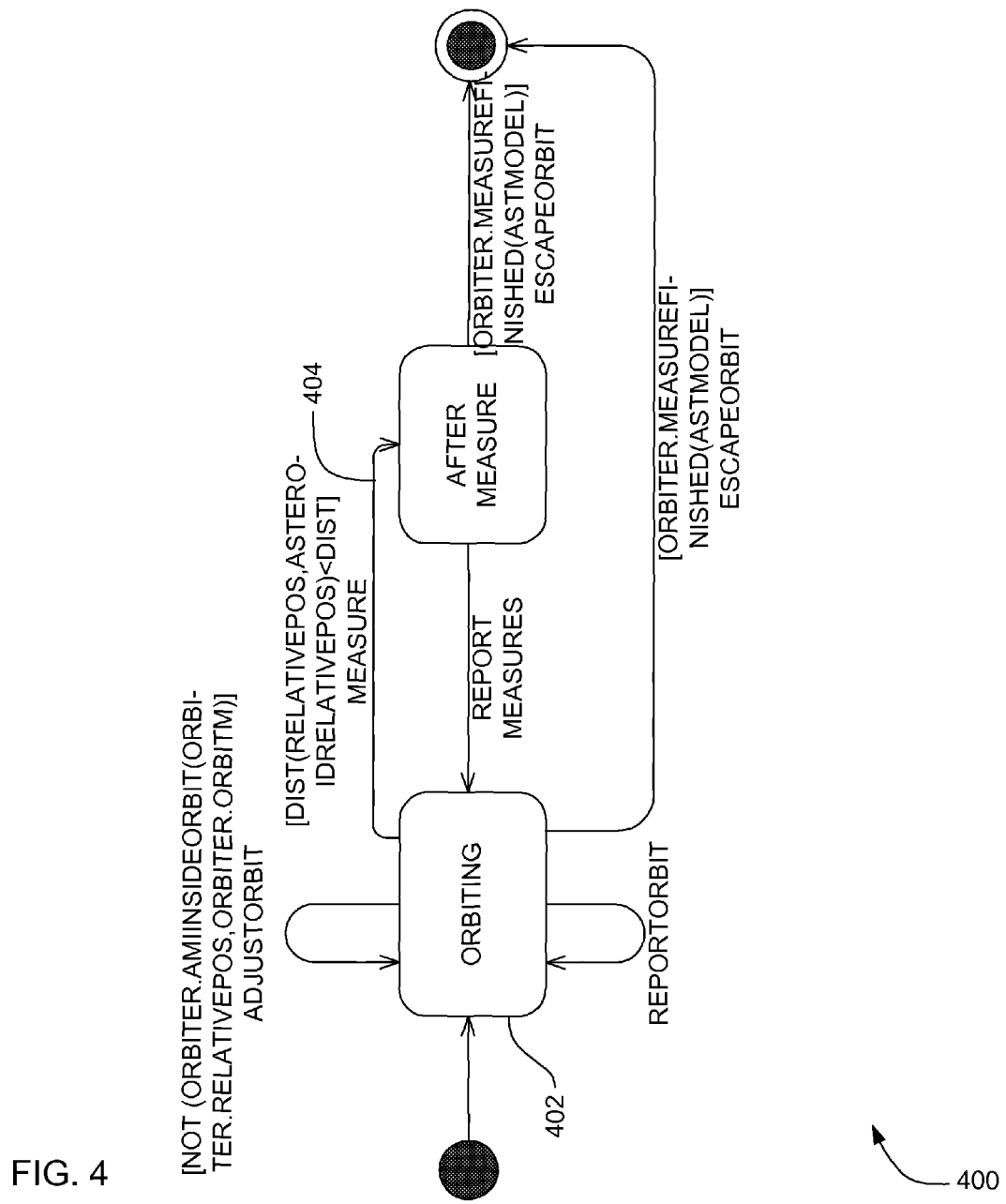
FIG. 4 and FIG. 5 are block state diagrams of an acquaintance sub-organization as a set of roles collaborating by use of several multi-role interactions, according to embodiments.
Figure 6:
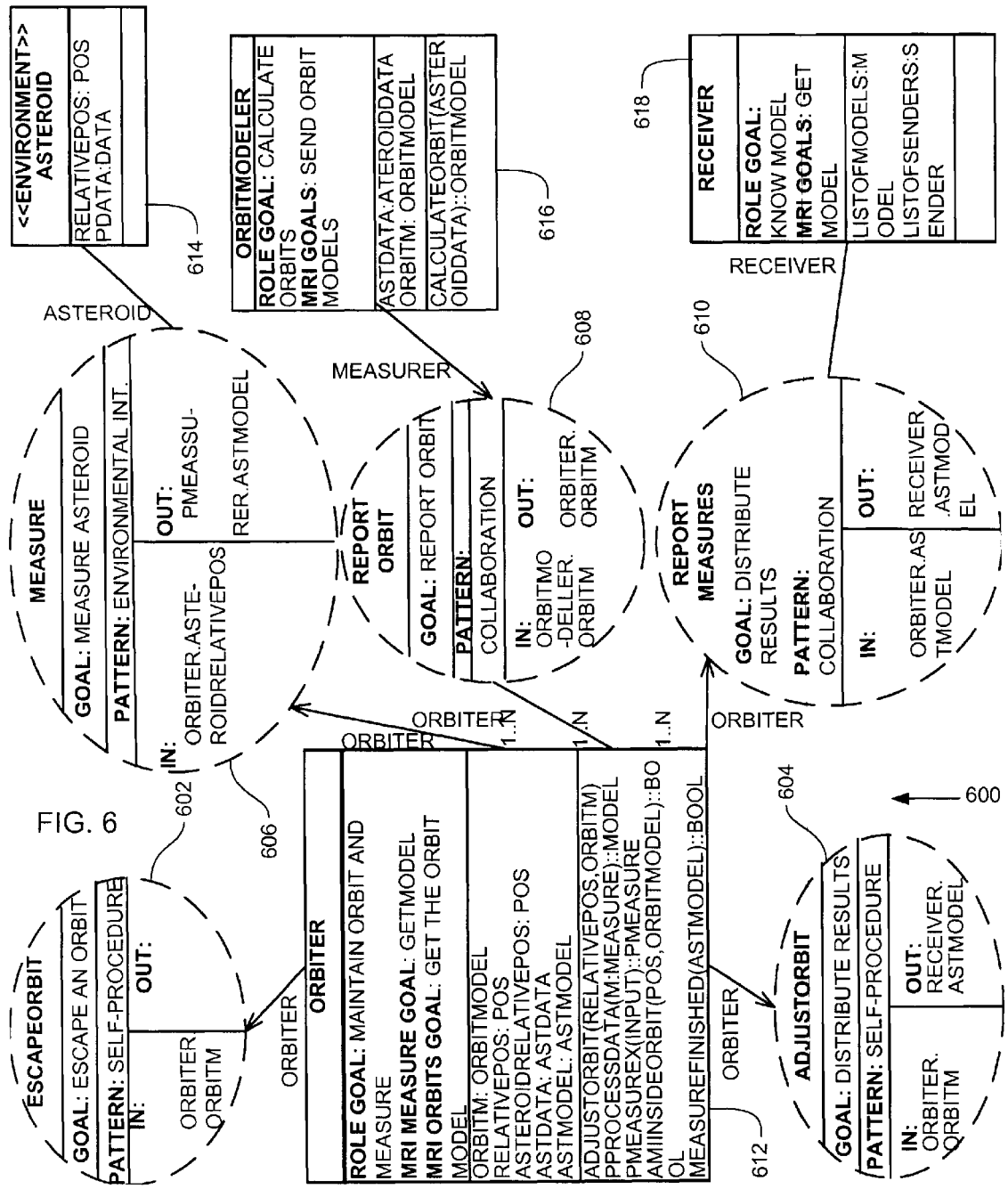
FIG. 6 and FIG. 7 are block diagrams of behavior of acquaintance organization, according to embodiments.

FIG. 4 is a block state diagram that describes a plan 400 of a role model, for example the role model described in FIG. 6. Plan 400 shows the order of execution of a multi-Role Interaction (mRI). In FIG. 4, a first state 402, depicts a swarm orbiting an asteroid in order to analyze the asteroid; in a second state, a solar storm occurs in the environment and the system changes 404 the state of the system to protect itself.

Figure 5:
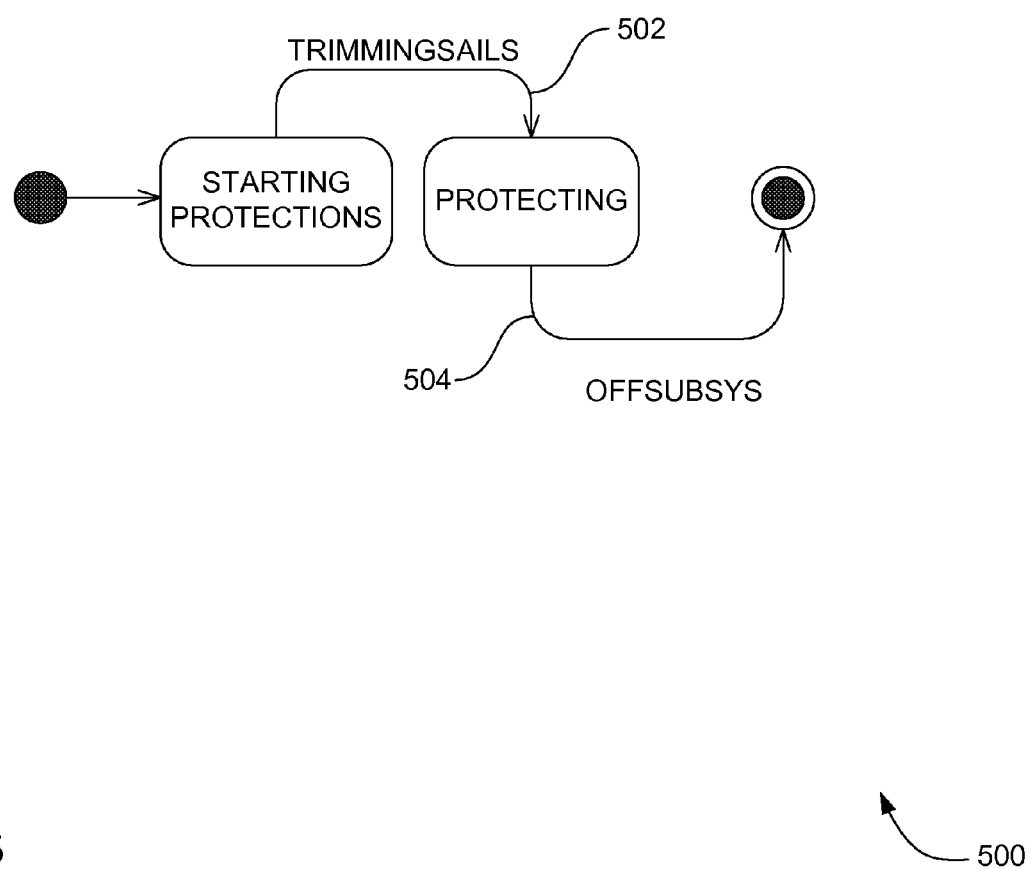
Figure 7:
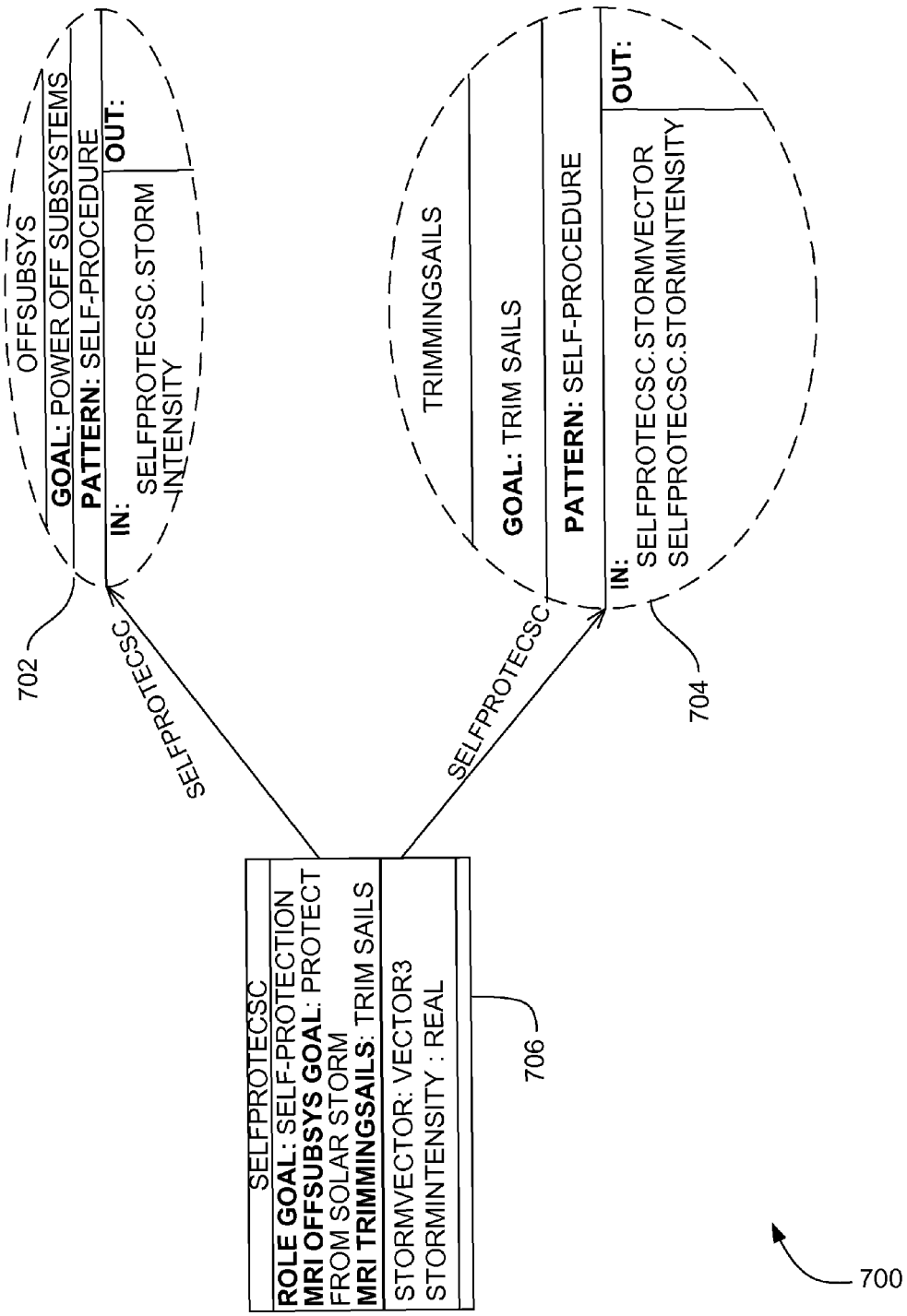

FIG. 5 is a block state diagram that describes a plan 500 of a role model, for example the role model described in FIG. 7. Plan 500 shows an order of execution of a mRI, according to an embodiment. In FIG. 5, examples of role models for both states are shown and an example of composition of both states, since both features of the system may not be completely orthogonal. To protect from a solar storm the spacecraft may take two basic actions: (a) orient its solar sails to minimize the area exposed to the solar storm particles (e.g. trim sails 502), and (b) power-off 504 all possible electronic components. Action 502 can minimize the forces from impinging solar-storm particles, which could affect the spacecraft's orbit. Both actions 502 and 504 can minimize potential damage from the charged particles in the storm, which can degrade sensors, detectors, electronic circuits, and solar energy collectors.

FIG. 6 and FIG. 7 are block diagrams of static acquaintance sub-organizations as a set of static roles 600 and 700, respectively. Roles 600 and 700 may collaborate by use of several multi-Role Interactions (mRI), according to embodiments. Roles 600 and 700 show all roles, in comparison to plans 400 and 500 that show the order of execution of multi-Role Interactions (mRI). Such mRIs can be used to abstract the acquaintance relationships among roles in the system. As mRIs allow abstract representation of interactions, these models can be implemented at one or more levels.

In FIG. 6, static role model 600 represents how a swarm of spacecraft may orbit an asteroid and measure the asteroid, according to an embodiment. In FIG. 7, static role model 700 represents how a swarm of spacecraft may protect from a solar storm while the swarm spacecraft continues in orbit, according to an embodiment. In FIG. 6 and FIG. 7, interfaces, shown as boxes, can represent the static features of roles showing their goals, the knowledge managed, and the services provided. The mRIs, shown as dashed ellipses and circles, can represent the interactions between the roles linked to them, showing the goal when collaborating, the pattern of collaboration, and the knowledge consumed, used, and obtained from the collaboration. Static role model 600 may include mRIs EscapeOrbit 602, AdjustOrbit 604, Measure 606, ReportOrbit 608 and ReportMeasures 610. Static role model 600 may further include roles Orbiter 612, <<Environment>> Asteroid 614, OrbitModeler 616, and Receiver 618. Static role model 700 may include mRIs OffSubsys 702 and TrimmingSails 704. Static role model 700 may also include role SelfProtectSC 706. These roles can be part of an object.

Descriptions of the system at different levels of abstraction may provide simplification of the tests based on formal methods, for example performing tests at a high level of abstraction and descending to a lower level of abstraction when one of these tests fails.

FIG. 6 and FIG. 7 are block diagrams of examples of behavior of acquaintance organization view. The behavioral aspect of an organization can show the sequencing of mRIs in a particular role model. The role model may be represented by two equivalent models.

A plan of a role separately can represent the plan of each role in a role model showing how the mRIs of the role sequence. By way of example, the plan is represented herein using UML 2.0 ProtocolStateMachines. ProtocolStateMachines can be used to focus on a certain role, while ignoring others.

Figure 8:
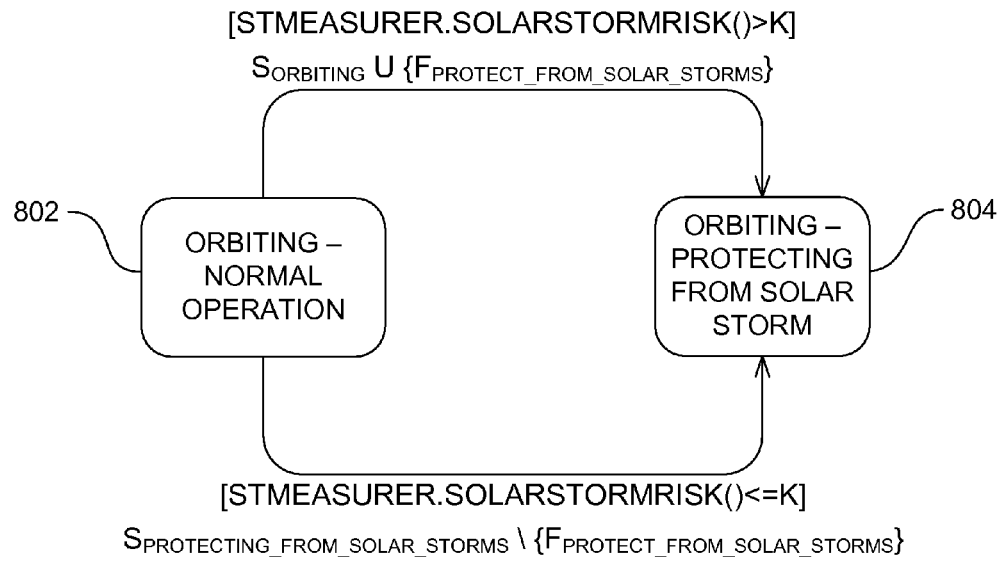

In FIGS. 8 and 9, plans 800 and 900, respectively, of role models are shown to represent the order of mRIs in a role model with a centralized description. The plan of the role model is herein represented using UML 2.0 StateMachines. StateMachines can be used to facilitate easy understanding of the whole behavior of a sub-organization.

Adding a new model to MaCMAS can represent the evolutions of the system. This model can be called the evolution plan.

Figure 10:
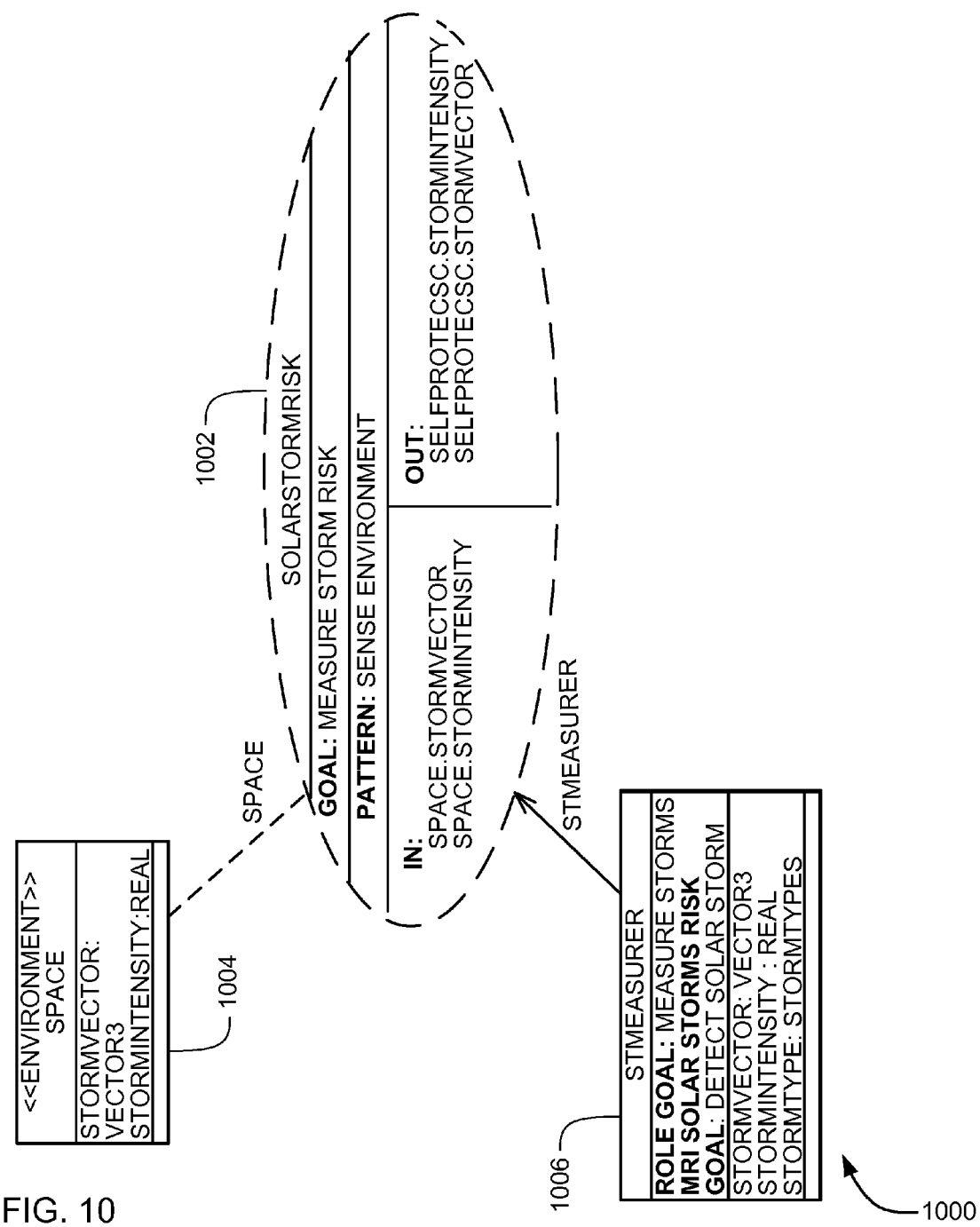
Figure 11:
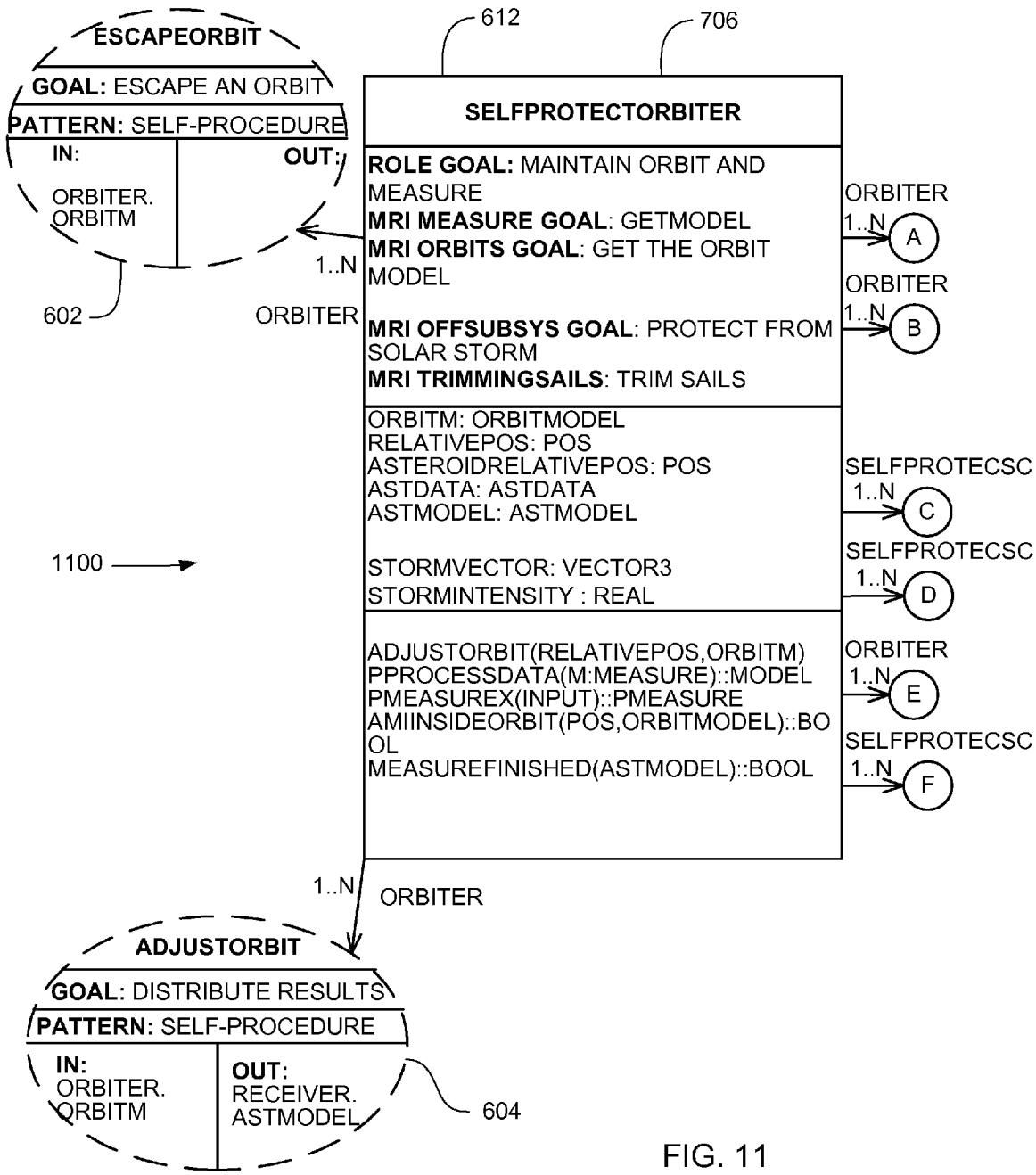
FIG. 11, FIG. 12, FIG. 13 and FIG. 14 are block diagrams of evolution from one plan to another plan, according to embodiments.

FIG. 8, FIG. 9 and FIG. 10 are block diagrams of an evolution plan, according to embodiments, measuring solar storm risk. The evolution plan may be represented by a UML state machine where each state represents a product, and each transition represents the addition or elimination of a set of features, that is to say, Δ. In addition, the conditions in the transitions can represent the properties that must hold in the environment and in the system in order to evolve to the new product.

In FIG. 8, a part of the evolution plan is shown. In FIG. 8, each role model is represented by state machines of system evaluation for adding system protection from solar storms. In FIG. 8, two products are represented, one product 802 representing the swarm when orbiting an asteroid under normal conditions, and another product 804 representing the swarm when orbiting and protecting from a solar storm. As can be seen, features can be added or deleted corresponding to protection from a solar storm depending on whether or not the swarm is under risk of solar storm, which can be measured by the feature represented in the role model of FIG. 9 and FIG. 10.

FIG. 9 is a state diagram that describes a plan 900 of a role model, for example the role model described in FIG. 10. Plan 900 shows the order of execution of a multi-Role Interaction (mRI), according to some embodiments. In plan 900, a first state 902, depicts measuring an asteroid in order to analyze the asteroid. FIG. 10 depicts static acquaintance sub-organizations as a set of static roles 1000. Static role 1000 may include mRI SolarStormRisk 1002. Static role 1000 may also include role <<Environment>> Space 1004 and role STMeasurer 1006.

FIG. 11, FIG. 12, FIG. 13 and FIG. 14 are block diagrams of an evolution from one plan to another plan, according to embodiments. Evolution from one plan to another plan can involve two general actions, namely, composing role models and decomposing role models. FIGS. 11-14, depicting evolving plans 1100, 1200, 1300 and 1400, respectively, illustrate the roles and plans of the embodiments of FIGS. 4-10.

The composition of role models may be used to map an acquaintance organization onto a set of agents, or in other words, a structural organization. This mapping may not always be orthogonal between all role models; applying two related features to a product may require their integration. The composition of a role model can be the process required to perform this integration. In the case of having orthogonal features, and thus orthogonal role models, only the prescribed roles can be assigned to the corresponding agents.

When composing several role models that are not independent, artifacts such as emergent roles and mRIs, can appear in the composition that do not belong to any of the initial role models. Composed roles and mRIs, the roles and mRIs in the resultant models that represent several initial roles or mRIs as a single element, and, unchanged roles and mRIs, can be left unchanged and imported directly from the initial role models.

Once the role models have been determined, the core architecture can be completed by composing those role models. Composing role models may also be performed to obtain a certain product. Importing an mRI or a role may require only its addition to the composite role model. The following shows an example of how to compose roles and plans.

In some embodiments, when several roles are merged in a composite role model, their elements can be merged as follows:

GOAL OF THE ROLE: The new goal of the role may abstract all the goals of the role to be composed. This information can be found in requirements hierarchical goal diagrams or this information can be added as the 'and' (conjunction) of the goals to be composed. In addition, the role goal for each mRI can be obtained from the goal of the initial roles for that mRI.

CARDINALITY OF THE ROLE: This can be the same as in the initial role for the corresponding mRI.

INITIATOR(S) ROLE(S): If mRI composition is not performed, as in the instant exemplary case, this feature may not change.

INTERFACE OF A ROLE: All elements in the interfaces of roles to be merged can be added to the composite interface. Notice that there may be common services and knowledge in these interfaces. When this happens, the common services and knowledge can be included only once in the composite interface, or renamed, depending on the composition of their ontologies.

GUARD OF A ROLE/MRI: The new guards can be the 'and' (conjunction) of the corresponding guards in initial role models if roles composed participate in the same mRI. Otherwise, guards may remain unchanged.

Evolution from the product Maintain Orbit And Measure, that may also have the feature Measure Storms, to the product Protect From Solar Storm may require the addition of the feature to protect from a solar storm. This may be true for at least two reasons. First, the features Maintain Orbit And Measure, and Measure Storms, may belong to the core architecture, and second, the Protect From Solar Storm can happen in any moment, and the last-made measurements of the asteroid must, in some embodiments, be reported before powering-off subsystems. Thus, as these role models may not be orthogonal, a composition of the roles models can be performed. This composition, represented in FIG. 11, can be done following the merged elements, or rules, prescribed above. As can be observed, all the mRIs and most roles can be imported. In addition, a composition of roles Self-ProtecSC and the rest in the role model Maintain Orbit And Measure may have been performed.

The composition of plans may include setting the order of execution of mRIs in the composite model and using the role model plan or role plans. One of several algorithms can be implemented to assist in this task, for example, extraction of a role plan from the role model plan and vice versa, and aggregation of several role plans.

Because of these algorithms, both plan views may be maintained as consistent without any prompting. Depending on the number of roles that have to be merged, the composition of the plan of the composite role model can be based on the plan of roles or on the plan of the role model. Several types of plan composition can be used for role plans and for role model plans, for example:

SEQUENTIAL: The plan can be executed atomically in sequence with others. The .nal state of each state machine can be superimposed with the initial state of the state machine that represents the plan that is to be executed, except the initial plan that maintains the initial state unchanged and the final plan that maintains the final state unchanged.

INTERLEAVING: To interleave several plans, a new state machine can be built where all mRIs in all plans are taken into account. Notice that usually the order of execution of each plan to be composed can be preserved. Algorithms can be implemented to check behavior inheritance to ensure that this constraint can be preserved, since to ensure this property, the composed plan may inherit from all the initial plans.

The composition of role model plans can be performed following one of the plan composition techniques described previously. Later, if the plan of one of the composed roles, as it may be needed to assign the new plan to the composed roles, may be of interest, the plan can be extracted using the algorithms mentioned previously.

A composition of role plans can be performed following one of the techniques to compose plans described previously. Later, if there is interest in the plan of the composite role model, for example for testing, the plan can be obtained using the algorithms mentioned previously.

Figure 12:
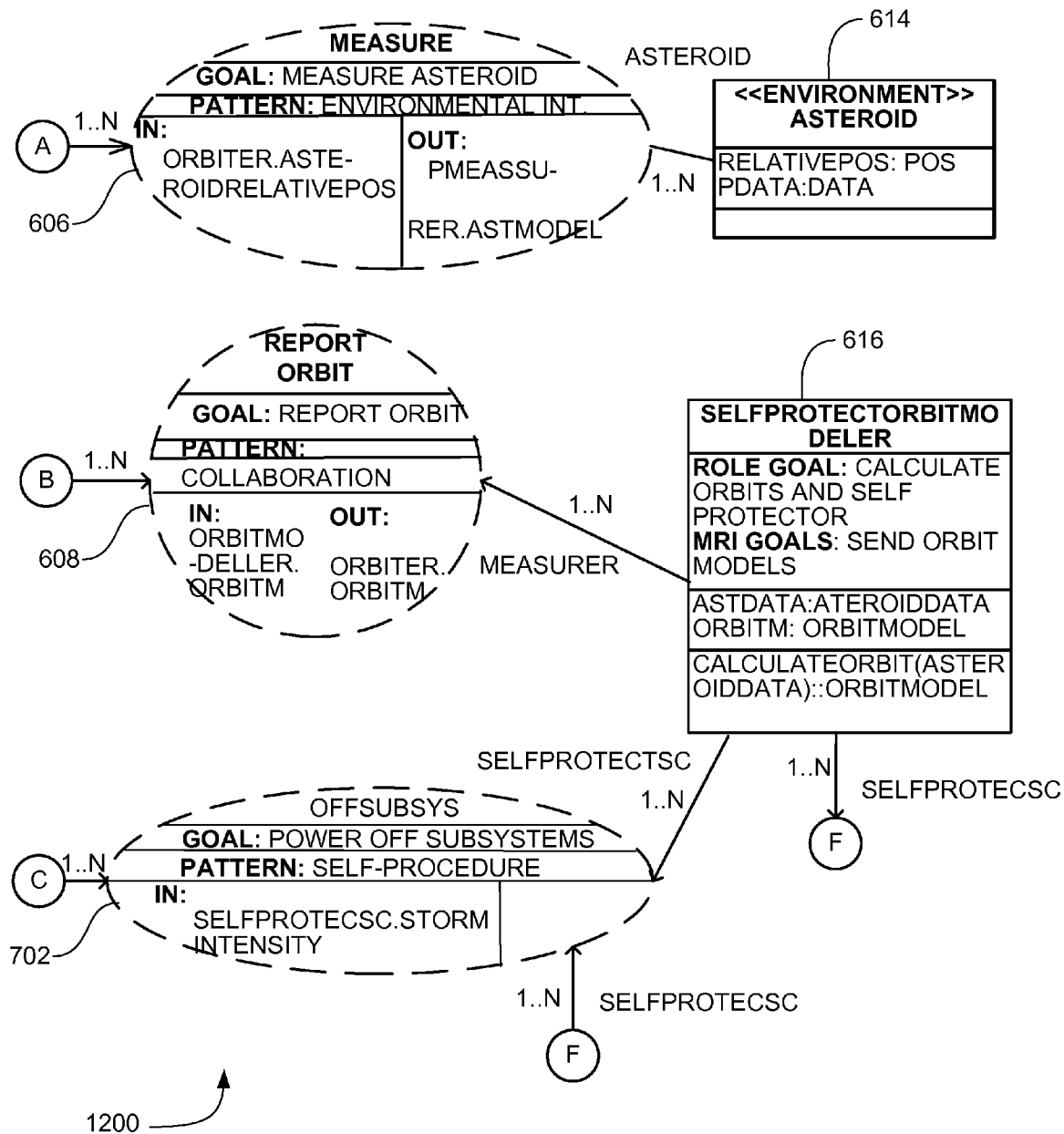
Figure 13:
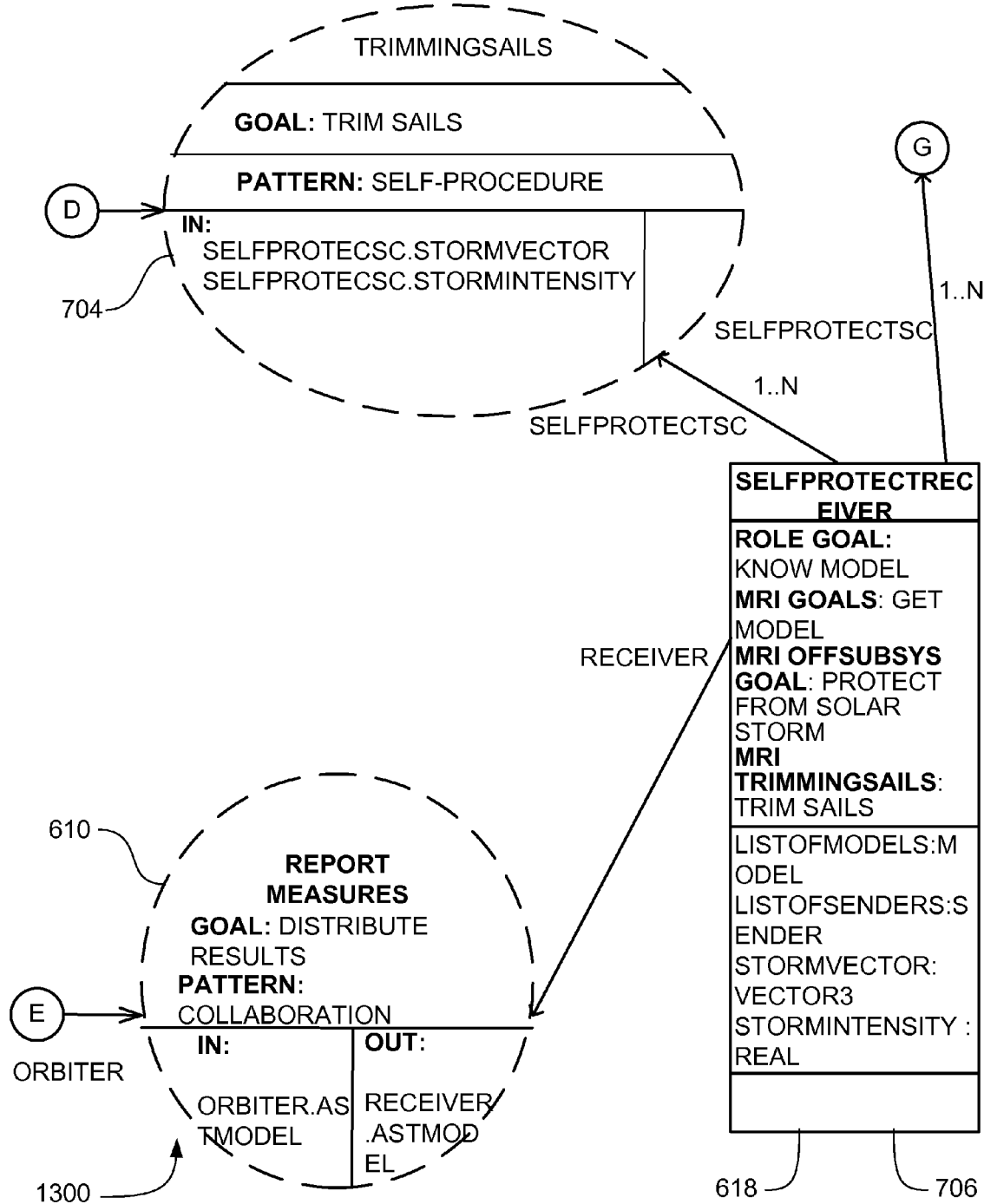
Figure 14:
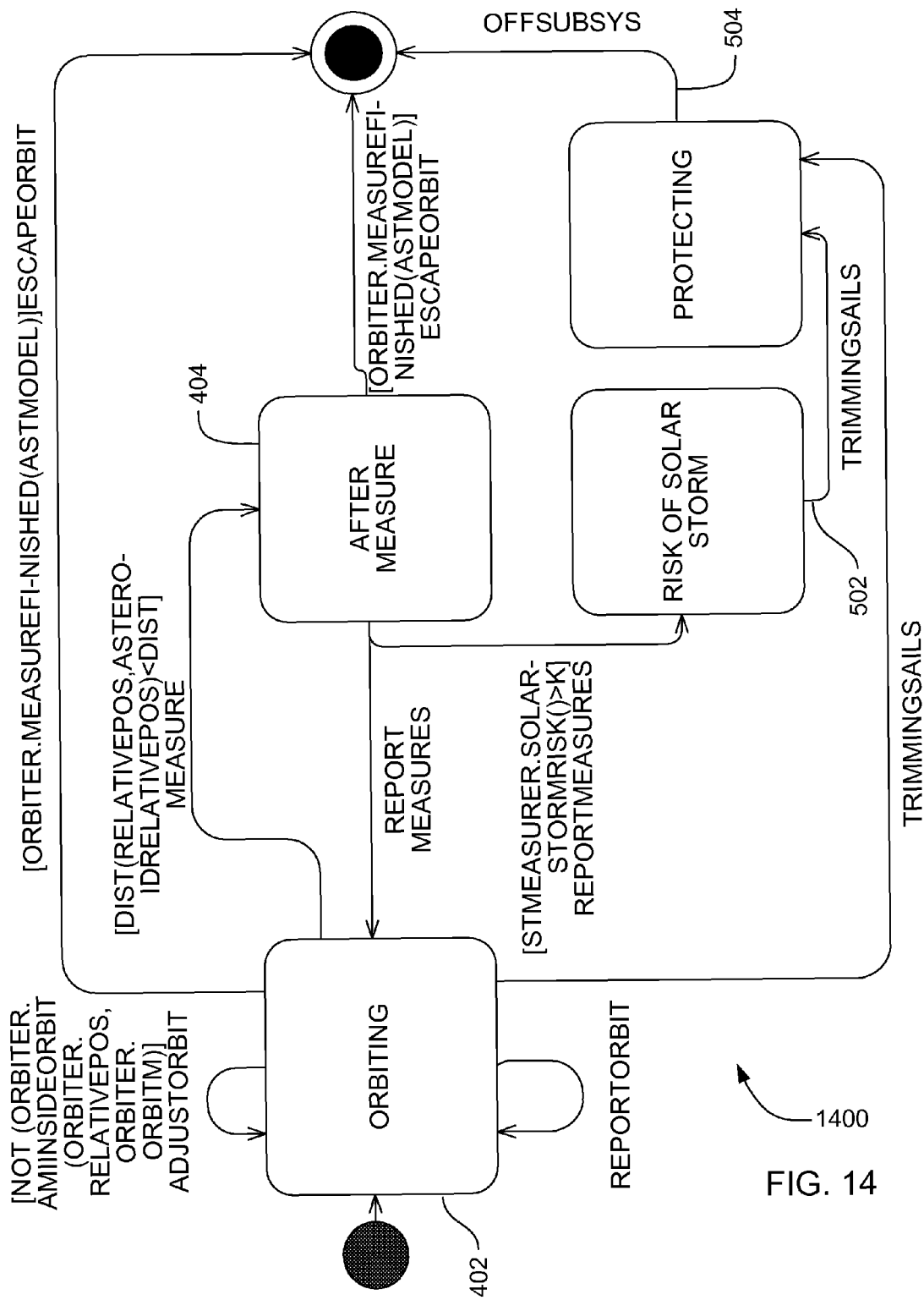

In each of FIG. 12, FIG. 13 and FIG. 14, a composed plan is shown, according to embodiments. This exemplary plan is shown to follow an interleaving composition in which the mRI Report Orbit 608 can measure before starting the Protect From Solar Storm. Notice that when finishing the solar storm, the system can evolve to the other product deleting the feature Protect From Solar Storm. Then, the plan of the feature Maintain Orbit and Measure can start from its initial state, thus restarting the exploration of the asteroid.

Decomposing role models can be simpler than composition. When the role model to be eliminated is orthogonal to the rest, only the corresponding roles may be deleted from the agents that are playing the roles. In the case where the role model is dependent with others, the elements of role models can be deleted and all the interactions that refer to the role models are eliminated. Given that, in the software architecture described herein, the system can support the role concept and its changes at run-time, the above-mentioned changes can be made easily with a lower impact on the system.

However, features may appear whose role models involve a dependency. In these cases, some roles may have to be decomposed. These roles can be those whose mRIs belong to the scope of the role model(s) that may be eliminated. In these cases, the role can be decomposed into several roles in order to isolate the part of the role to be deleted.

In addition, the mRI(s) of the role model(s) can be eliminated from the role model plan or the role plans. This may be done starting from the plan of the initial dependent role models. Each separate role model usually can maintain the order of execution of mRIs determined in the initial model, but executes only a subset of mRIs of the initial role models. The behavior of the role model to be deleted can be extracted automatically. This algorithm may allow the extraction of the plan of remaining role models from the initial ones constraining this to the set of mRIs that remains in the model.

Apparatus components of the FIGS. 4-12 can be embodied as computer hardware circuitry or as a computer-readable program, or a combination of both. In another embodiment, components in FIGS. 4-12 can be implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components can communicate in any of a number of ways that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 302 in FIG. 3, or on at least as many computers as there are components.

CONCLUSION

A software product line of multi-agent systems is described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A tangible computer-accessible storage medium having executable instructions to create a multi-agent system software product line, the software product line being a collection of software systems, the software systems of each collection exhibiting common properties and common code, the software systems of each collection differing from each other software system in at least a supported functionality, the executable instructions capable of directing a processor to perform:
   generating a domain of reusable core assets; and
   generating a software product, wherein the software product is an implementation of a software system from the reusable core assets, the core assets being software components considered to be common to the software products in the product line from at least one agent-based addition.

2. The tangible computer-accessible storage medium of claim 1, wherein the instructions are further capable of directing a processor to perform:
   generating domain requirements for systems in the product line;
   analyzing a domain; and
   engineering the domain, wherein engineering the domain comprises generating the product from the core assets common to the software products and variations specific to the system software product.

3. The tangible computer-accessible storage medium of claim 2, wherein the instructions are further capable of directing a processor to perform:
   providing a description of the requirements of a family of products, wherein products comprise software systems that share a core of common code and common functionality, describing both common and variable features, wherein a feature is a function or support for a function provided by the software system across the family where the family is a number of software systems that share a common set of core assets, the core assets comprising common code, common features, or common functionality,) and differ in functionality or platform;
   determining which common and variable features exist in the domain; and
   specifying features that are optional, mandatory, and alternative in the family.

4. The tangible computer-accessible storage medium of claim 3, wherein the instructions are further capable of directing a processor to perform:
   producing architecture-independent models that define the features of a family and the domain of application; and
   orthogonally modeling an acquaintance organization, wherein the acquaintance organization specifies which entities or components in the system interact with one another to provide change to system goals enabled in the system by changing parts of the acquaintance organization present in a structural organization.

5. The tangible computer-accessible storage medium of claim 2, wherein the instructions are further capable of directing the processor to perform:
   producing a core architecture, wherein the core architecture comprises architecture common to the software products in a family, the core architecture being formed as a composition of role models corresponding to the reusable core assets, wherein a role model describes the roles that a component plays in a system.

6. The tangible computer-accessible storage medium of claim 3, wherein each of the features comprises:
   a characteristic of the system that is observable by an end user, which represents a system goal.

7. The tangible computer-accessible storage medium of claim 1, wherein the agent-based addition further comprises:
   an agent-based addition that is changed more than the reusable core assets.

8. The tangible computer-accessible storage medium of claim 1, wherein the system further comprises:
   a plurality of cooperating agents.

9. A computer-implemented method to evolve from one plan to another plan, the method comprising:
   integrating role models to map an acquaintance organization onto a set of agents; and
   integrating role models into a composite role model to generate a product,
   wherein a role model describes the roles that a component plays in a system.

10. The computer-implemented method of claim 9, wherein a plurality of the role models further comprise:

an acquaintance sub-organization operable to collaborate by use of a plurality of multi-role interactions.

11. The computer-implemented method of claim 10, wherein the multi-role interactions further comprise:

a representation of interactions between linked roles, showing a goal when collaborating, the pattern of collaboration, and knowledge consumed, used, and obtained from the collaboration.

12. The computer-implemented method of claim 9, wherein integrating the role models into a composite role model further comprises:

merging several roles into the composite role model, in consideration of at least one goal of at least one of the roles, at least one cardinality of at least one of the roles, at least one initiator of at least one of the roles, at least one interface of at least one of the roles, and at least one guard of at least one of the roles.

13. The computer-implemented method of claim 9, wherein integrating role models to map an acquaintance organization onto a set of agents further comprises:

integrating role models that are not independent;
leaving unchanged roles; and
importing directly from initial role models.

* * * * *